Nov. 17, 1953    N. A. VANDERLOOP    2,659,288
TRACTOR PLOW ATTACHMENT
Filed May 29, 1952    2 Sheets-Sheet 1
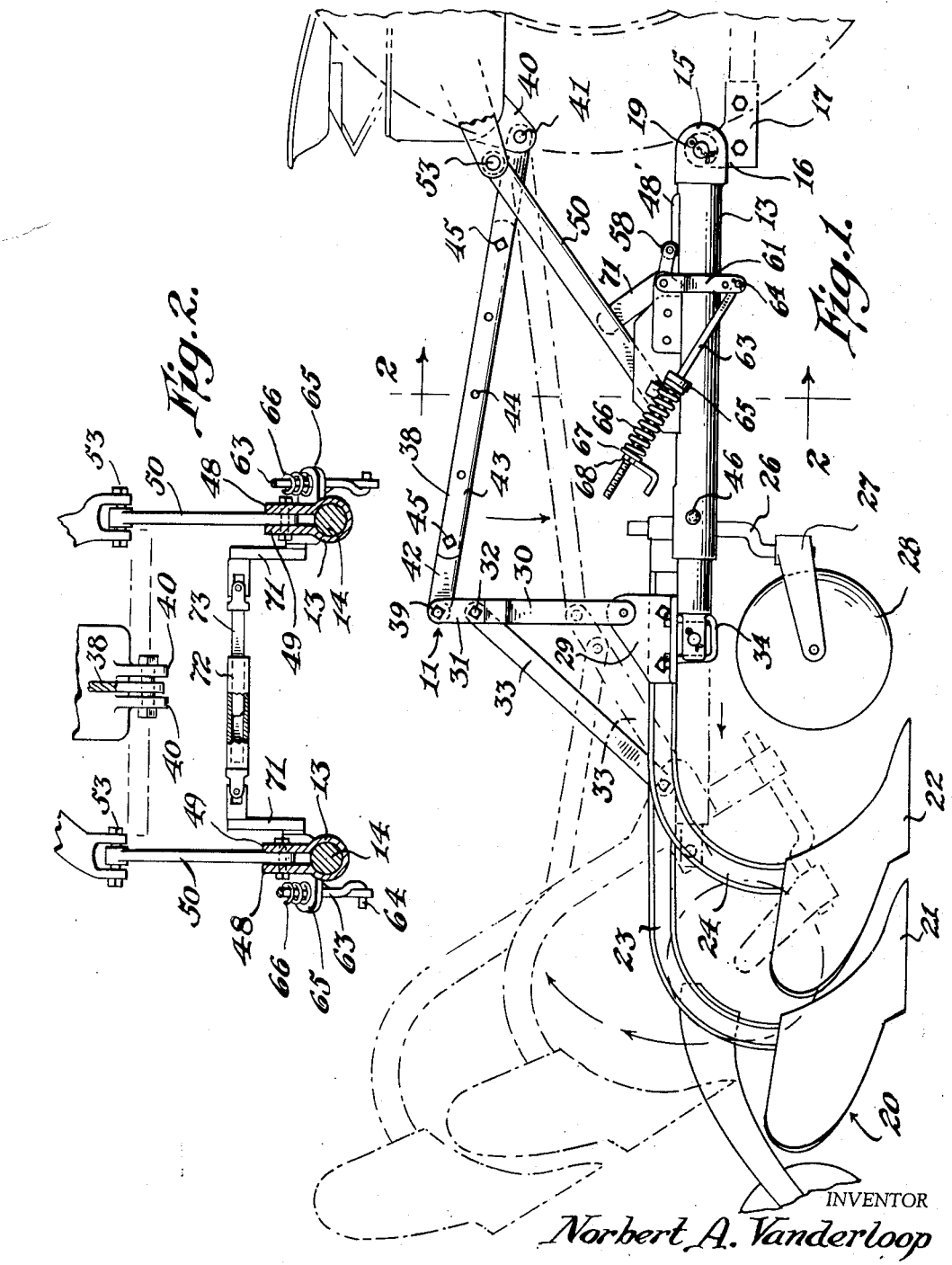
INVENTOR
Norbert A. Vanderloop
BY
McMorrow, Berman + Davidson
ATTORNEYS Nov. 17, 1953  N. A. VANDERLOOP  2,659,288
TRACTOR PLOW ATTACHMENT
Filed May 29, 1952  2 Sheets-Sheet 2
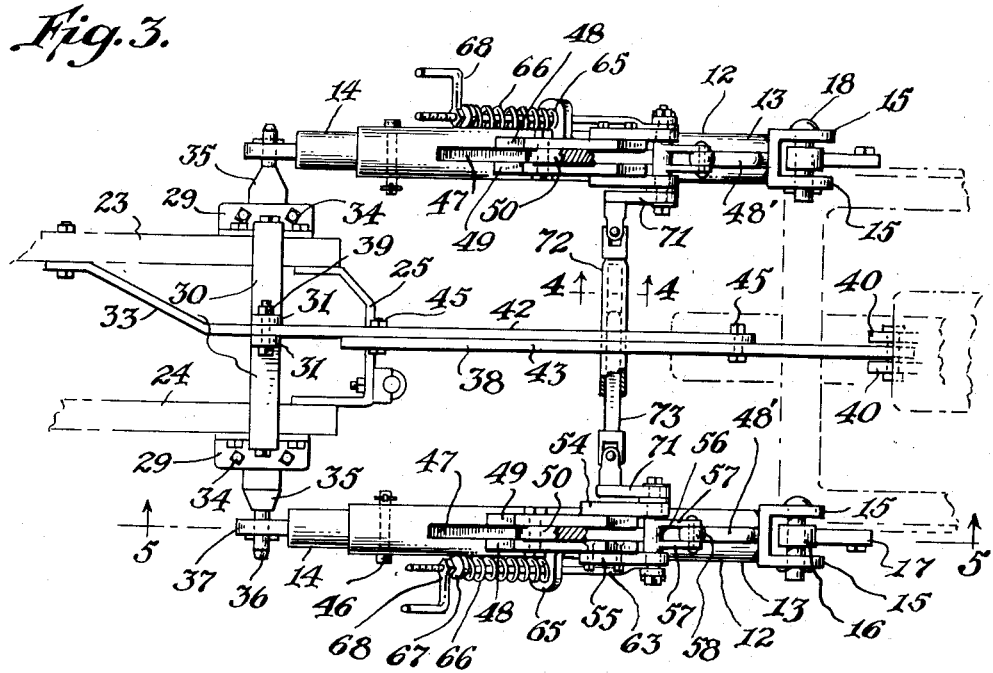
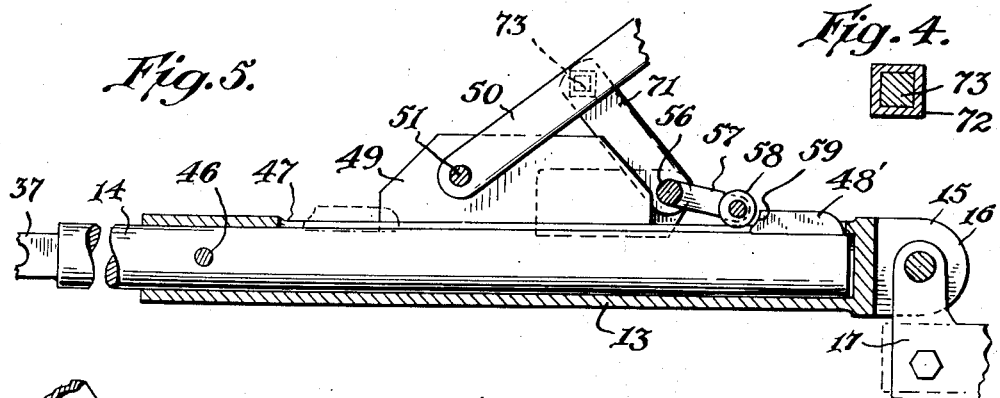
INVENTOR
Norbert A. Vanderloop
BY
McMorrow, Berman + Davidson
ATTORNEYS Patented Nov. 17, 1953

2,659,288

UNITED STATES PATENT OFFICE 2,659,288

TRACTOR PLOW ATTACHMENT

Norbert A. Vanderloop, Forest Junction, Wis.

Application May 29, 1952, Serial No. 290,655

2 Claims. (Cl. 97—47.89)

This invention relates to plow attachments for tractors, and more particularly to an improved plow attachment for tractors which includes safety means for allowing the plow portion of the attachment to yield when encountering immovable obstacles, whereby damage to the plow portion and to the remainder of the device is avoided.

A main object of the invention is to provide a novel and improved tractor plow attachment which is simple in construction, which is easy to install, and which is arranged so that the plow share portion thereof yields automatically in response to the engagement therewith of an immovable obstacle, said plow share portion being swingable upwardly in response to engagement with such an obstacle and being automatically swingable downwardly to its normal operating position in response to the backing up of the tractor thereafter.

A further object of the invention is to provide an improved safety plow attachment for a tractor which involves inexpensive components, which is rugged in construction, which provides an efficient plowing action under normal terrain conditions and which is automatically yieldable in response to the engagement of the plow share portion thereof with an obstacle of unusual resistance, whereby damage to the plow share portion of the device or to the remaining elements thereof is avoided.

Further objects and advantages of the invention will become apparent from the following description and claims, and from the accompanying drawings, wherein:

Figure 1 is a fragmentary side elevational view of an improved plow attachment constructed in accordance with the present invention, shown in normal operating position.

Figure 2 is a cross sectional view taken on the line 2—2 of Figure 1.

Figure 3 is a top plan view, partly in horizontal cross section, showing the plow attachment of Figures 1 and 2.

Figure 4 is an enlarged cross sectional detail view taken on the line 4—4 of Figure 3.

Figure 5 is an enlarged cross sectional detail view taken on the line 5—5 of Figure 3.

Figure 6 is an enlarged perspective detail view of portions of the yieldable locking means controlling the release of the plow share portion of the tractor responsive to the engagement therewith of with a substantially immovable obstacle, the elements being shown in separated positions, for purposes of illustrating the manner of assembly thereof.

Referring to the drawings, the plow attachment is designated generally at 11. The attachment comprises the telescopic boom members 12, 12, each boom member 12 comprising a sleeve element 13 and a bar member 14 slidably disposed in the sleeve element 13. The front end of each sleeve element 13 is formed with the spaced parallel trunnion lugs 15, 15 receiving the upstanding arm 16 of a bracket member 17 secured to the rear portion of the tractor to which the device is attached, the upstanding arm 16 being pivotally connected to the trunnion lugs 15, 15 by a transverse bearing pin 18 retained in connecting position by a cotter pin 19 engaged through the end of its shank portion. Designated generally at 20 is a plow share assembly, said assembly comprising the plow share blades 21 and 22 secured on plow beams 23 and 24 connected together at their front ends by a transverse bar member 25 to which is journaled the vertical offset disc shaft 26. Disc shaft 26 has secured thereto the disc yoke 27 in which is journaled the plow disc 28.

Secured to the front portions of the respective plow beams 23 and 24 are the brackets 29, 29 to which are secured the upwardly and inwardly extending bars 30, 30, said bars terminating in the upstanding lugs 31, 31 which are rigidly secured together by a transverse bolt 32, said bolt also fastening an intervening strut bar 33 between the upstanding lugs 31, 31, said strut bar being connected to the plow beam 23, whereby the elements 30, 30 are made rigid with respect to the plow beams 23 and 24. Secured to the brackets 29 by respective U-bolts 34 are the laterally extending shaft members 35, each shaft member 35 terminating in a reduced portion 36 which extends through an apertured lug 37 extending axially from the end of a respective bar member 14, whereby the respective booms 12 are pivotally connected to the plow share assembly. Designated at 38 is an adjustable link bar which connects the top ends of the lugs 31, 31 to the rear portion of the tractor, the rear end of the link bar 38 being pivotally connected between the lugs 31, 31 by a transverse bolt 39 and the forward end of the link bar 38 being received between a pair of parallel lugs 40, 40 projecting from the rear of the tractor and being pivotally connected to said lugs by a transverse bolt 41. As shown in Figures 1 and 3, the link bar 38 comprises a pair of bar elements 42 and 43 which are adjustably secured together to provide a desired composite length for the link bar 38. The bar elements 42 and 43 may be provided with registrable openings 44 through which the fastening bolts 45, 45 may extend, as shown in Figures 1 and 3. A transverse locking pin 46 may be engaged transversely through the sleeve element 13 and bar element 14 of each boom member 12 to lock the boom against extension, whereby the plow assembly 20 is rigidly connected to the tractor.

The top of each sleeve element 13 is formed with a longitudinal slot 47, and the front portion of each bar member 14 is formed with an upstanding rib 48' which projects through the slot 47 and which is longitudinally slidable therein. Rigidly secured to the top of each sleeve element 13 on opposite sides of the slot 47 are the spaced longitudinally extending upstanding flanges 48 and 49 receiving therebetween the rear end of a downwardly and rearwardly inclined link bar 50 connected thereto by a transverse pin 51. The forward end of each link bar 50 is connected to the rear end of the tractor at 53, whereby each sleeve element 13 is rigidly supported in a substantially horizontal position projecting from the rear end of the tractor. Secured to the flanges 48 and 49 are the respective forwardly extending plate members 54 and 55, said plate members extending beyond the ends of the flanges 48 and 49, and having journaled therein the transverse shaft member 56. The shaft member 56 is formed with the parallel arms 57, 57 extending over the slot 47, and journaled between the ends of said parallel arms 57, 57 is the roller 58 which is in the same longitudinal vertical plane as the rib 48' and which is engageable with the arcuate inclined edge 59 formed at one end of rib 48'. The outer end portion of each shaft element 56 is formed with a squared section 60 which is lockingly engaged in the square aperture 62 of a bar 61. Designated at 63 is a rod member formed with the transverse end portion 64 rotatably secured in an aperture formed in the end of bar member 61, the rod 63 extending slidably through a lug 65 formed on the adjacent sleeve member 13. A coiled spring 66 surrounds the upper portion of the rod 63, the top end of the spring 66 being engaged by a bearing washer 67 which is in turn engaged by a nut 68 threaded on the top end of the rod 63. It will be noted that the spring 66 provides a biasing action tending to rotate the arm 61 clockwise, as viewed in Figure 1, whereby the roller 58 is biased into engagement with the arcuate inclined camming surface 59 on the rib 48'.

The inner ends of the shaft members 56 are likewise formed with squared portions 69 which engage in square apertures 70 of arm 71. One arm 71 has pivotally connected thereto a sleeve member 72 formed with a squared bore, and the other arm 71 has pivotally connected thereto a square shaft 73 which is slidably and non-rotatably received in the sleeve 72, whereby the shaft members 56 on the opposite sides of the attachment are synchronized in their operation.

It will be understood that the locking pins 46 are removed when it is desired to provide the yielding action of the plow share assembly 20 to prevent damage to the plow share blades or other elements of the assembly when working over terrain containing substantially immovable obstacles, such as tree stumps, heavy rocks, or the like. With the pin elements 46 removed, the engagement of the plow share blades with such an immovable obstacle will cause tension to be developed on the bar members 14, bringing the inclined arcuate surfaces 59 of the ribs 48 into engagement with the roller 58 with a force exceeding the biasing force exerted on the roller 58 by the springs 66. The rollers 58 are thus caused to ride up onto the top of the ribs 48', releasing the bars 14 and allowing said bars 14 to extend themselves rearwardly from the sleeve elements 13. This allows the plow share assembly to swing clockwise, as viewed in Figure 1, for example, to the dotted line position shown in Figure 1, whereby the plow share assembly may ride over the obstacle or may at least be elevated thereby to a position which is clearly visible to the operator of the tractor, thus preventing damage to the plow share element by advising the operator that such an obstacle has been encountered. By backing up the tractor, the plow share blades may be disengaged from the obstacle and the plow share assembly will be thus allowed to descend to its normal operating position in which the rollers 58 engage against the inclined arcuate cam surfaces 59 of the ribs 48, the bars 14 telescoping inwardly into the sleeve members 13 by the force exerted thereon resulting from the descent of the plow share assembly to its normal position, shown in full line view in Figure 1. It will thus be clearly apparent that the plow share assembly is automatically released responsive to the engagement thereof with a substantially immovable obstacle and the assembly is elevated instead of being forced against the obstacle, thereby preventing damage to the plow share blades or other components of the assembly.

While a specific embodiment of an improved tractor plow attachment has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a tractor plow attachment, a plow assembly, a telescopic boom adapted to be connected at one end to a tractor, means pivotally connecting the other end of said boom to said plow assembly, an upstanding arm on said assembly, a link bar pivotally connected at one end to said arm and adapted to be connected at its other end to the tractor, and yieldable means on said telescopic boom limiting extension of said boom, said boom comprising an outer sleeve, and a bar member slidably positioned in said outer sleeve for telescoping movement therein, and said yieldable means comprising a projection on said bar member, a lever pivoted to said outer sleeve and engageable with said projection to prevent extension of the bar member from the sleeve, and spring means biasing said lever against said projection, said spring means being yieldable when the plow assembly encounters an obstacle, causing said assembly to be swung upwardly.

2. In a tractor plow attachment, a plow assembly, a telescopic boom comprising an outer sleeve adapted to be connected to a tractor and a bar member slidably positioned in said sleeve and pivotally connected to said plow assembly, an upstanding arm on said assembly, a link bar pivotally connected to said arm and adapted to be pivotally connected at its other end to the tractor, said sleeve being formed with a slot, a projection on said bar member extending through said slot, said projection having an inclined rear edge, a lever pivoted to said sleeve above said slot and being engageable with said projection to prevent extension of said bar member, and spring means biasing said lever into engagement with said inclined rear edge, said spring means being yieldable to allow said lever to rotate away from said projection by the camming cooperation thereof with said inclined rear edge responsive to excessive tension on said bar member resulting from the engagement of the plow assembly with an obstacle.

NORBERT A. VANDERLOOP.

References Cited in the file of this patent

UNITED STATES PATENTS

| Number | Name | Date |
|---|---|---|
| 275,146 | Clark | Apr. 3, 1883 |
| 1,347,589 | Ramos et al. | July 27, 1920 |
| 1,381,041 | Warner | June 7, 1921 |
| 1,441,773 | Witter | Jan. 9, 1923 |
| 1,783,081 | Goddard et al. | Nov. 25, 1930 |